US012620218B2

(12) United States Patent
Francesconi et al.

(10) Patent No.: US 12,620,218 B2
(45) Date of Patent: May 5, 2026

(54) VISUALIZATIONS OF TASKS OF MULTIPLE IMAGING DEVICES

(71) Applicant: Datalogic IP Tech S.R.L., Lippo di Calderara di Reno (IT)

(72) Inventors: Alessandro Francesconi, Bologna (IT); Gianbattista Gualeni, Brescia (IT); Marcello Circo, Casalecchio di Reno (IT); Luca Soffritti, Casalecchio di Reno (IT)

(73) Assignee: Datalogic IP Tech S.R.L., Lippo di Calderara di Reno (Bologna) (IT)

( * ) Notice: Subject to any disclaimer, the term of this patent is extended or adjusted under 35 U.S.C. 154(b) by 481 days.

(21) Appl. No.: 18/124,440

(22) Filed: Mar. 21, 2023

(65) Prior Publication Data

US 2024/0320968 A1 Sep. 26, 2024

(51) Int. Cl.
*G06V 10/96* (2022.01)
*G06T 7/00* (2017.01)
(Continued)

(52) U.S. Cl.
CPC ............ *G06V 10/96* (2022.01); *G06T 7/0004* (2013.01); *G06T 7/80* (2017.01); *G06V 10/94* (2022.01);
(Continued)

(58) Field of Classification Search
CPC ........ G06V 10/96; G06V 10/94; G06V 20/44; G06V 30/127; G06T 7/0004; G06T 7/80;
(Continued)

(56) References Cited

U.S. PATENT DOCUMENTS 6,057,839 A * 5/2000 Advani ................. G06F 11/323
714/E11.181
2004/0215987 A1* 10/2004 Farkas .................. G06F 9/5088
713/300
(Continued)

OTHER PUBLICATIONS

Datalogic, "MX-E Processor with PNP (sourcing) I/O", Quick Reference Guide, https://www.datalogic.com/upload/ia/manuals/mx_e_series_quick_a3_en_rev_a.pdf (accessed Sep. 13, 2023) (2 pages).

*Primary Examiner* — Jorge A Chu Joy-Davila
(74) *Attorney, Agent, or Firm* — Shook, Hardy & Bacon L.L.P.

(57) ABSTRACT

Systems, methods, and media are described herein for providing one or more visualizations corresponding to one or more tasks executed by a core processor on image data from one or more imaging devices (e.g., a camera). For example, an inspection cycle of the core processor can be initiated for determining or identifying unexpected events associated with the tasks of the core processor. Each inspection cycle may correspond to a particular imaging device. In some embodiments, an inspection cycle includes inspections of a grabbing task, a pre-processing task, a processing task, an idle period, another type of task, or one or more combinations thereof. A visualization that includes the unexpected event and the inspection cycle is provided for display on a user interface. In some embodiments, the visualization includes a standard error bar for the pre-processing task, processing task, idle period, or one or more combinations thereof.

20 Claims, 6 Drawing Sheets

(51) Int. Cl.
    G06T 7/80         (2017.01)
    G06V 10/94       (2022.01)
    G06V 20/40       (2022.01)
    G06V 30/12       (2022.01)

(52) U.S. Cl.
    CPC ............ G06V 20/44 (2022.01); G06V 30/127
           (2022.01); *G06T 2200/24* (2013.01); *G06T*
                             *2207/30164* (2013.01)

(58) Field of Classification Search
    CPC ....... G06T 2200/24; G06T 2207/30164; G06F
               11/3013; G06F 11/3024; G06F 11/323;
                                   G06F 11/3409
    See application file for complete search history.

(56)                   References Cited

U.S. PATENT DOCUMENTS

| 2008/0260296 | A1* | 10/2008 | Chung | ....................... | G06T 1/20 |
| | | | | | 382/307 |
| 2011/0106577 | A1* | 5/2011 | Nakazato | ........... | G06Q 10/0633 |
| | | | | | 705/7.27 |
| 2014/0052555 | A1* | 2/2014 | MacIntosh | ............... | G07G 1/12 |
| | | | | | 705/23 |
| 2020/0228668 | A1 | 7/2020 | Yamazaki | | |
| 2021/0323150 | A1 | 10/2021 | Cho et al. | | |

* cited by examiner

300

RECEIVE IMAGE DATA FROM
AN IMAGING DEVICE    ~ 302

INITIATE AN INSPECTION OF A CORE    ~ 304

FOR EACH TASK OF THE INSPECTION,
IDENTIFY A START TIME OF THE
INSPECTION AND UPDATE A RELATIVE
ERROR BAR USING STANDARD DEVIATION    ~ 306

PROVIDING A VISUALIZATION
CORRESPONDING TO THE TASK AND THE
INSPECTION    ~ 308

VISUALIZATIONS OF TASKS OF MULTIPLE IMAGING DEVICES

BACKGROUND

Desktop and laptop computers implement algorithms that monitor central processing unit features, such as a quantity that is currently in use (e.g., 17% utilization over 60 seconds). With the advent of mobile devices becoming ubiquitous and providing functions such as still camera, video camera, global positioning system navigation, web browsing, email communications, and texting, processing power required to support such devices and functions has increased. As such, there is a need to provide effective management of processor(s) of various computing devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the technology disclosed herein correspond to providing one or more visualizations including graphical representations of one or more inspection cycles of a core that executes tasks on image data from one or more imaging devices (e.g., a camera, a computing device having a camera, an optical character recognition device, a medical imaging device). The tasks, for example, may include the transfer of image data from an imaging device (e.g., to a local or external data store), calibrating the image data, filtering the image data, other methods of image data pre-processing, processing the image data, another type of task associated with the image data, or one or more combinations thereof. The inspections cycles includes inspections of the tasks executed by the core.

As such, in some embodiments, the one or more visualizations may include one or more inspection cycles and inspections of the tasks for each inspection cycle. In some embodiments, each task may be represented by a different symbol. Additionally, one or more unexpected events can be identified based on one or more inspection cycles of one or more cores. For example, an unexpected event may include jitter in the duration of processing one or more tasks corresponding to one or more cores, processing time above an average processing time of a particular task or a duration for a complete inspection cycle for an individual core, an unexpected delay between the processing of two tasks, another type of unexpected event, or one or more combinations thereof. Based on identifying the unexpected event, the one or more visualizations provided may include the unexpected event.

As indicated above, the one or more cores (e.g., of a central processing unit) may receive image data from imaging devices for the execution of the tasks. In some embodiments, a plurality of cores of a data processing engine receive the image data simultaneously. For example, a first plurality of cores of the data processing engine can receive a first set of image data simultaneously and a second plurality of cores of the data processing engine can receive a second set of image data simultaneously. Further, in some embodiments, the number of imaging devices is greater than the number of cores of the data processing engine receiving the image data. Accordingly, the one or more visualizations may include inspection cycles of the first plurality of cores executing tasks on the first set of image data simultaneously. Additionally or alternatively, the one or more visualizations may also include the inspection cycles of the second plurality of cores executing tasks on the second set of image data simultaneously.

In some embodiments, the one or more visualizations comprise a graphical representation illustrating a spatial and temporal distribution of image data associated with at least one imaging device and at least one core. The one or more visualizations, for example, may be provided in real-time or near real-time. The visualizations may also be provided in multi-dimensional space (e.g., via an augmented or virtual reality device). In some embodiments, the one or more visualizations are provided via an interactive display.

BRIEF DESCRIPTION OF THE DRAWINGS

The present disclosure is illustrated by way of example and not limitation in the accompanying figures in which like reference numerals indicate similar elements and in which.

DETAILED DESCRIPTION

Figure 1:
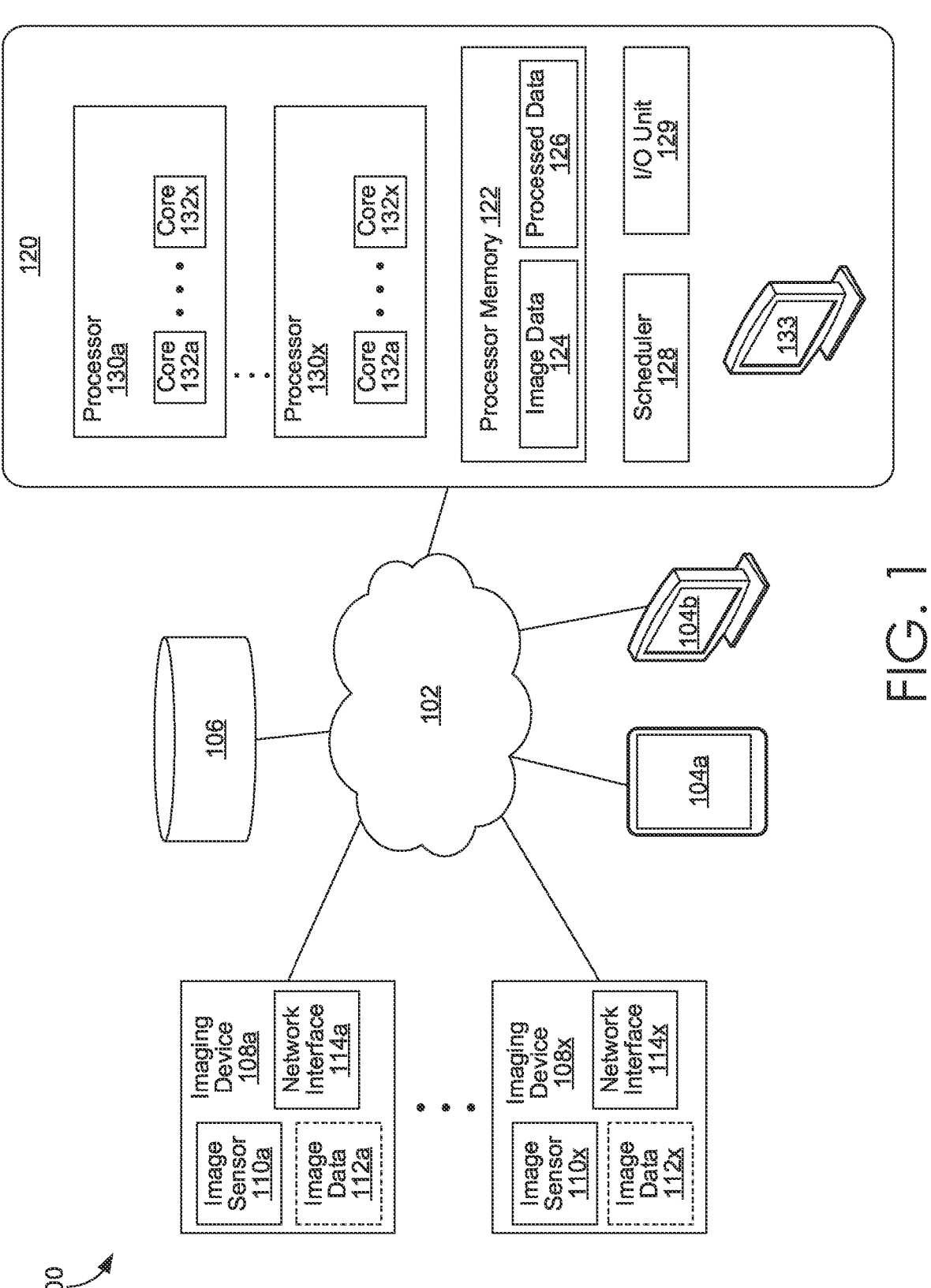
FIG. 1 a schematic diagram of an example data processing system for providing a visualization including an inspection cycle and unexpected event, in accordance with an embodiment of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media (see, e.g., FIG. 6).

In addition, words such as "a" and "an," unless otherwise indicated to the contrary, may also include the plural as well as the singular. Thus, for example, the constraint of "a feature" is satisfied where one or more features are present.

Further, the term "or" includes the conjunctive, the disjunctive, and both (a or b thus includes either a or b, as well as a and b).

Furthermore, the term "some" may refer to "one or more."

Additionally, an element in the singular may refer to "one or more."

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

By way of background, prior methods and systems do not provide particular ways for balancing and organizing various workflows for processing image data (e.g., via a plurality of cores of at least one central processing unit). Additionally, prior methods and systems do not provide users with a detailed analysis of the workload distribution (e.g., corresponding to the cores or to memory). Without providing the particular ways for balancing and organizing the workflows, these methods and systems resulted in increased temperatures for components (e.g., an increased temperatures of a central processing unit), one or more processors being overworked, and decreased processing speeds. In addition, without providing users with a detailed analysis of the workload distribution, processor inspection durations are longer, unexpected events cannot be anticipated (e.g., jitter in a processing time), other predictions corresponding to idle time cannot be determined, as well as other deficiencies.

The technology disclosed herein can cure at least these deficiencies in these prior methods and systems. For example, the technology disclosed herein provides for effective management of processor(s) of various computing devices (e.g., core processors of a central processing unit). To illustrate, particular methods are provided for balancing and organizing various workflows for processing image data. Additionally, particular systems and methods herein provide users with one or more detailed analyses of the workload distribution among a plurality of cores. In doing so, the technology disclosed herein provides for decreases in temperatures for hardware components, a reduction of processors being overworked, and increased processing speeds. In addition, processor inspection durations are reduced, unexpected events can be anticipated, other predictions corresponding to idle time can be determined, as well as other improvements.

Accordingly, at a high level, this disclosure describes, among other things, methods, computer-readable media, and systems are disclosed for providing one or more visualizations including one or more inspection cycles of one or more cores (e.g., of a central processing unit), wherein the inspection cycles involve inspections of one or more tasks (e.g., pre-processing of image data received from one or more imaging devices). In an embodiment, a system comprises a plurality of imaging devices that each have at least one sensor, an electronic display configured to display a user interface (e.g., a graphical user interface) for displaying visualizations, a data processing engine operably coupled to the imaging devices and electronic display, at least one central processing unit (CPU) having one or more cores, and one or more computer storage memory having computer-executable instructions stored thereon that, when executed by the one or more cores, cause the one or more cores to perform operations.

The operations, for example, may include receiving image data (e.g., at the data processing engine) from the plurality of imaging devices. Based on receiving the image data, the data processing engine having at least one CPU may initiate a first inspection (e.g., an inspection cycle including inspections a pre-processing task and processing task executed on the image data) of a first core of the one or more cores, the first inspection corresponding to a first set of image data from a first imaging device of the plurality of imaging devices. The data processing engine may also initiate a second inspection of the first core, the second inspection corresponding to a second set of image data from a second imaging device of the plurality of imaging devices. Further, at least one unexpected event may be identified based on the first inspection and the second inspection of the first core. In some embodiments, the unexpected event can be identified based on inspections of a second core. In some embodiments, the unexpected event can be identified based on an inspection of the first core and an inspection of the second core. For example, the inspections of the cores may be inspection cycles that include a pre-processing task (e.g., associated with image sampling or localization of the image data). In some embodiments, the inspections cycles also include processing tasks (e.g., associated with analyzing image data via machine vision techniques, barcode decoding algorithms, optical character recognition (OCR), artificial intelligence, etc.). A visualization may be provided on the user interface of the electronic display, the visualization including the first inspection and the second inspection of the first core. The visualization may also include the unexpected event.

In another embodiment, a method includes providing one or more visualizations, via an electronic display configured to display the visualizations on a user interface, the visualizations including the one or more inspections of tasks (e.g., pre-processing, processing, idle time) executed by the core on image data from imaging devices. The method comprises receiving, at a data processing engine operably coupled to a plurality of imaging devices and an electronic display configured to display a user interface, image data from a plurality of imaging devices. Based on receiving the image data, a plurality of inspection cycles of the core (e.g., inspections cycles involving an inspection of a task, such as pre-processing of the image data and processing of the image data) are initiated. Each inspection cycle corresponds to at least one imaging device. The method also comprises identifying at least one unexpected event based on the plurality of inspection cycles. The unexpected event may include, for example, jitter in the duration of processing one or more tasks corresponding to one or more cores, jitter during one or more portions of an inspection cycle, processing time above an average processing time of a particular task, inspection cycle time above an average inspection cycle time for an individual core, an unexpected delay between the processing of two tasks, an unexpected delay between two inspection cycles, another type of unexpected event, or one or more combinations thereof. Additionally, a visualization may be provided for display on a graphical user interface. The visualization, for example, may include a visual representation for the plurality of inspection cycles of the one or more cores. The visualization may also include the unexpected event identified, one or more inspections of the tasks within an inspection cycle, a duration of the inspection cycle, a duration of the one or more tasks within the inspection cycle, or one or more combinations thereof. The durations of each inspection cycle and/or tasks therein may be visualized based on analyzing a sampling of historical inspection cycles and their respective tasks as will be described further below.

Another embodiment may correspond to one or more non-transitory computer-readable storage media having computer-executable instructions embodied thereon that, when executed by one or more processors, perform a method for providing one or more visualizations associated with one or more inspections cycles of a core based on tasks corresponding to image data from imaging devices. The method may comprise receiving image data from a plurality of imaging devices and initiating an inspection cycle of at least one core of a data processing engine based on the at least one core executing a processing task and having an idle period during the inspection cycle. Additionally, the method may comprise identifying at least one unexpected event based on the inspection cycle and durations of processing tasks and idle periods of historical inspection cycles of the at least one core executing the processing tasks of the historical inspection cycles on historical image data from the first imaging device. A visualization may be provided for display on a graphical user interface. The visualization may include the at least one unexpected event, the inspection cycle, tasks corresponding to the inspection cycle, other inspection cycles of the at least one core, other inspection cycles of other cores, or one or more combinations thereof.

Referring now to the drawings generally and, more specifically, referring to FIG. 1, an aspect of an operating environment 100 is provided as an example embodiment of the technology disclosed herein. Certain items in block-diagram form are shown more for being able to reference something consistent with the nature of a patent than to imply that a certain component is or is not part of a certain device. Similarly, although some items are depicted in the singular form, plural items are contemplated as well (e.g., what is shown as one data store might really be multiple data stores distributed across multiple locations); but showing every variation of each item might obscure the embodiments illustrated. Thus, for readability, items are shown and referenced in the singular (while fully contemplating, where applicable, the plural).

As shown in FIG. 1, example operating environment 100 includes a schematic diagram of an example system for providing one or more visualizations (e.g., visualization 200 of FIG. 2) including one or more inspections (e.g., an inspection cycle or an inspection of a particular task, such as an image data processing task including applying an algorithm (e.g., a multithreaded color image processing algorithm utilizing a fuzzy technique and edge detection) to pixel data of the image data received from one or more imaging devices). Example operating environment 100 includes network 102, computing devices 104a and 104b, data store 106, imaging devices 108a . . . 108x, and data processing engine 120. Other embodiments of example operating environment 100 may include a plurality of networks, a plurality of data stores, a plurality of central processing units, other items or components, or one or more combinations thereof.

Network 102 provides a communication link among the one or more computing devices 104a . . . 104X, the one or more imaging devices 108a . . . 108x, and data processing engine 120. In embodiments, the network 102 may include one or more wires, one or more wireless communication links, one or more fiber optic cables, another type of connection, or one or more combinations thereof. In embodiments, the network 102 and Internet represent a worldwide collection of networks and gateways that use the Transmission Control Protocol/Internet Protocol (TCP/IP) suite of protocols for communications. The network 102 may include a number of different types of networks (e.g., an intranet, a local area network (LAN), a wide area network (WAN), another type of network, or one or more combinations thereof). The network 102 may provide for communication (among the one or more computing devices 104a . . . 104X, the one or more imaging devices 108a . . . 108x, and data processing engine 120) via mmWaves, FD-MIMO, massive MIMO, 3G, 4G, 5G, 6G, another type of Generation, 802.11 protocols and techniques, another type of wireless communication, or one or more combinations thereof.

In embodiments, the network 102 is the cloud or a cloud computing network (e.g., in communication with one or more Internet of Things devices). For example, the network 102 may include various types of Internet of Things networks, such as a mesh network via Bluetooth low energy links or IPv6 over a low power wide-area network compatible with an Internet Engineering Task force specification. In some embodiments, one or more of the Internet of Things networks of network 102 may operate by network and internet application protocols including Constrained Application Protocol. Further, the one or more of the Internet of Things networks may also be integrated with one or more coordinator devices that provide a chain of links forming a cluster tree of linked devices and networks.

As illustrated in example operating environment 100, computing device 104a includes a mobile device and computing device 104b depicts another type of computing device. In other embodiments, more or less computing devices may utilize network 102. As used herein, a "computing device" is a device that has the capability of receiving or transmitting a signal. A "computing device" may also be referred to as a "user device," "client device," "mobile device," "user equipment (UE)," or "wireless communication device." A computing device, in some aspects, may take on a variety of forms, such as a PC, a laptop computer, a desktop computer, a tablet, a mobile phone, a PDA, a server, an Internet of Things device, or any other device that is capable of communicating with other devices (e.g., by transmitting or receiving a signal using a wireless communication). A computing device may also be, in another embodiment, similar to computing device 600, described herein with respect to FIG. 6.

As noted above, the computing device may include Internet of Things devices, such as one or more of the following: a sensor (e.g., a temperature sensor), controller (e.g., a lighting controller, a thermostat), an appliance (e.g., a smart refrigerator, a smart air conditioner, a smart alarm system), other Internet of Things devices, or one or more combinations thereof. Internet of Things devices may be stationary, mobile, or both. In some aspects, the computing device is associated with a vehicle (e.g., a video system in a car capable of receiving media content stored by a media device in a house when coupled to the media device via a local area network). In some aspects, the computing device comprises a medical device, a location monitor, a clock, a drone, a remote weather station, another wireless communication device, or one or more combinations thereof.

In some embodiments, a computing device discussed herein may be configured to communicate using one or more of 4G (e.g., LTE), 5G, 6G, another communication system, or one or more combinations thereof. In some embodiments, the computing device has a radio that connects with a 4G cell site but is not capable of connecting with a higher generation communication system. In some embodiments, the computing device has components to establish a 5G connection with a 5G gNB, and to be served according to 5G over that connection. In some embodiments, the computing device may be an E-UTRAN New Radio-Dual Connectivity (ENDC) device. ENDC allows a user device to connect to an LTE eNB that acts as a master node and a 5G gNB that acts as a secondary node. As such, in these embodiments, the ENDC device may access both LTE and 5G simultaneously, and in some cases, on the same spectrum band.

Data store 106 generally stores information including data, data structures, computer instructions (e.g., software program instructions, routines, or services), one or more models (e.g., machine learning models) used in some embodiments herein, one or more of image data 112a . . . 112x (e.g., pixel representations of objects) from the imaging devices 108a . . . 108x, or one or more combinations thereof. In some embodiments, the image data 112a . . . 112x is stored and indexed based on a framerate in which the image data was captured by imaging devices 108a . . . 108x. In one example embodiment, image data 112a is associated with a first framerate and image data 112c is associated with a second framerate. In another embodiment, the image data 112a-112d stored in data store 106 is associated with a predetermined framerate. In some embodiments, the image data 112a . . . 112x is stored based on a timestamp, and organized based on the timestamp.

In an embodiment, data store 106 comprises computer data memory. Further, although depicted as a single data store component, data store 106 may be embodied as one or more data stores or may be in the cloud. In some embodiments, the data store 106 may include an index data structure, a resource data structure, or a combination thereof. The data store 106 may comprise data sources and/or data systems, which are configured to make data available to any of the various constituents of example operating environment 100. Data store 106 may be discrete from computing devices 104a and 104b (e.g., because the data store 106 comprises distributed storage devices in a Storage Area Network) or may be incorporated and/or integrated into at least one of the computing devices.

Example operating environment 100 may also include one or more imaging devices 108a . . . 108x. Each imaging device may include one or more image sensors for generating image data and a network interface for transmitting the image data generated. As used herein, an "imaging device" is a device that can capture one or more digital images (e.g., one or more still images, one or more sequences of images, video frames, other image types, or one or more combinations thereof). An imaging device, for example, may include a digital camera, a digital video device, a wireless communication device, an optical character recognition device, a finger scanner device, an eye scanner device, a barcode scanning device, an x-ray device, a computed tomography scan, a magnetic resonance imaging device, an ultrasound, a positron-emission tomography, another type of medical imaging device, another type of magnetic particle imaging device (e.g., nuclear magnetic resonance), a 3-D scanner, an augmented or virtual reality device, another type of multiple dimension imaging device, another type of imaging device, or one or more combinations thereof. An imaging device may also be, in another embodiment, similar to imaging device 500, described herein with respect to FIG. 5.

In some embodiments, one or more of the imaging devices 108a . . . 108x can perform focusing techniques (e.g., by using a range sensor). For example, one or more of the imaging devices 108a . . . 108x may perform an auto-focus technique associated with a range between the imaging device and a subject of the image. An auto-focus technique may include phase-difference detection auto-focus (e.g., by using a phase-difference detection sensor and a phase-difference detection auto-focus processor), contrast detection auto-focus, or one or more combinations thereof. As such, the image data 112a . . . 112x may include pixel data, focus data, or one or more combinations thereof. Further, an image device may have one or more image sensors. For example, image sensors 110a . . . 110x may include an array of pixels comprising imaging pixels. In some embodiments, the array of pixels also includes focus pixels. The imaging pixel data of the image data 112a . . . 112x may be based on signals from imaging pixels and focus pixel data of the image data 112a . . . 112x may be based on signals from the focus pixels. In some embodiments, the array of pixels includes an array of photodiodes (e.g., photodiodes of focus pixels).

The image sensors 110a . . . 110x of the imaging devices 108a . . . 108x are sensors that detect and convey data image data for generating an image. One or more of the image sensors 110a . . . 110x may comprise an active-pixel sensor, a complementary metal oxide semiconductor image sensor, an N-channel metal oxide semiconductor image sensor, a P-channel metal oxide semiconductor image sensor, a dynamic vision sensor, a charge-coupled device image sensor, an optical character recognition sensor, a programmable gain amplifier, a range sensor, a thermal imaging sensor, a radar sensor, an ultrasonic sensor, an mmWaves radar sensor, another type of image sensor, or one or more combinations thereof. In some embodiments, one or more of the image sensors 110a . . . 110x may be a rolling shutter sensor (e.g., a sensor that does not expose a whole frame at once, but instead scans each line of the frame, such that the line scanning frequency of the sensor is higher than the frame rate of the sensor) or a global shutter sensor.

One or more of the image sensors 110a . . . 110x may be capable of capturing images in a file format, such as Joint photographic experts group (JPEG), Graphics interchange format (GIF), Standards for bitmap (BMP), Tagged image file format (TIFF), another type of file format usable for images (e.g., some of which may be converted to a different format before processing the image), or one or more combinations thereof. As such, one or more of the image data 112a . . . 112x may be stored in a data store (e.g., data store 106, a data store local to one of the imaging devices 108a . . . 108x, or a data store local to the data processing engine 120) as JPEG, GIF, BMP, TIFF, another format usable for images, or one or more combinations thereof.

In embodiments, one or more of the image sensors 110a . . . 110x include an image processor. For example, the image processor can process corresponding image data 112a . . . 112x (e.g., frame-based image data, frames of video data, encoded video data, sensor-mode settings, zoom settings, 3A parameters). Additionally or alternatively, the image processor can process packet-based image data (e.g., received from the dynamic vision sensor). In some embodiments, the image processor can perform formatting, color interpolation, color correction, auto white balance, color saturation correction, gamma correction, hue correction, bad pixel correction, another type of processing, or one or more combinations thereof. Additionally or alternatively, the image processor can correct a hot pixel, a timestamp value of a noise pixel, or a dead pixel (e.g., via a temporal correlation between timestamp values of adjacent pixels of the dynamic vision sensor).

A network interface 114a . . . 114x for each of the imaging devices 108a . . . 108x may allow the data processing engine 120 to receive the image data 112a . . . 112x via the network 102. As illustrated in example operating environment 100, the data processing engine 120 includes one or more processors 130a . . . 130x each having one or more cores 132a . . . 132x, memory 122 for storing image data 124 (e.g., received from computing devices 104a, 104b or imaging devices 108a . . . 108x over network 102) and processed image data 126 (e.g., processed by the one or more processors 130a . . . 130x via the one or more cores 132a . . . 132x), a scheduler 128, and an input/output (I/O) unit 129. The data processing engine 120 is illustrated as an example. However, a system to which the technology according to the present disclosure is applicable is not limited to solely this example of the data processing engine 120. As an example, the data processing engine 120 may also comprise one or more neural compute sticks, such as, for example, the Intel® Movidius™ NCS (a USB-based deep learning, self-contained device used for artificial intelligence programming at the edge).

In some embodiments, a first processor 130a of the data processing engine 120 is a central processing unit (CPU) having a plurality of cores 132a . . . 132x and a second processor 130b of the data processing engine 120 is a graphics processing unit (GPU) (e.g., for rendering 2D and 3D graphics or assisting the CPU in non-graphics processing). Continuing the example, the GPU may also have one or more cores. As another example, a plurality of processors 130a . . . 130x of the data processing engine 120 are the CPU, wherein each CPU has a plurality of cores 132a . . . 132x. In some embodiments, one or more of the processors 130a . . . 130x correspond to one or more edge servers (e.g., 5G edge servers), such as multicore edge servers, that may effectuate distributions of data flows (e.g., communication flows, packet flows, a flow of one or more data packets, other types of data flows, or one or more combinations thereof) from the imaging devices 108a . . . 108x and computing devices 104a, 104b and to the data processing engine 120 via an edge network (e.g., network 102).

In some embodiments, the processors 130a . . . 130x or a portion of the processors 130a . . . 130x of the data processing engine 120 is implemented as a system on chip on a semiconductor die. In some embodiments, one or more of the processors 130a . . . 130x include a micro-processor, an embedded processor, a digital signal processor, a network processor, another type of processor configured to execute code, or one or more combinations thereof. In some embodiments, one or more of the cores 132a . . . 132x include a single-threaded core, a multithreaded core (e.g., having more than one hardware thread context), another type of core, or one or more combinations thereof. In some embodiments, the data processing engine 120 is configured to process the image data 112a . . . 112x from each of the imaging devices 108a . . . 108x in parallel using a plurality of cores 132a . . . 132x, such that the processors 130a . . . 130x provide for faster data transfers, faster processing via the I/O unit 129, reduced I/O latency, and an increased usage of CPU resources.

The memory 122 may include one or more non-transitory storage resources, which may include a non-transitory disk drive, an optical disk drive, a magnetic disk drive, another type of storage resource, or one or more combinations thereof. The non-transitory disk drive may be configured to persistently store data within or retrieve data from a non-transitory storage medium, such as a hard disk, solid-state storage medium, Flash storage medium, another type of storage medium, or one or more combinations thereof. The non-transitory disk drive may comprise one or more of a hard disk drive, solid-state storage device, solid-state drive, solid-state memory device, non-volatile memory device, another type of memory device, or one or more combinations thereof. The optical disk drive may be configured to store or retrieve data from an optical storage medium. The optical storage medium may comprise a compact disk (CD), digital versatile disk (DVD), another type of disk, or one or more combinations thereof.

Program modules and data may also be stored in the memory 122. For example, the program modules and data may include, for example, an operating system, an application program, other programs or modules, or one or more combinations thereof. In embodiments, the application program may include logic capable of providing the optical character recognition functionality. For example, the application program may receive image data 112a . . . 112x from the imaging devices 108a . . . 108x or the image data 124 stored within the memory 122 and process the image data 112a . . . 112x, image data 124, or one or more combinations thereof using the optical character recognition functionality. As another example, the memory resources may include communications programs configured to enable the data processing engine 120 to access and exchange data with other networked systems or components, such as the imaging devices 108a . . . 108x or the computing devices 104a, 104b.

The scheduler 128 can help improve load balancing and workload distribution among the processors and among the cores of the processors of the data processing engine 120. For example, the scheduler 128 can scale (e.g., dynamically scale) the use of the cores 132a. 132x of each processor 130a . . . 130x to facilitate a distributed processing of the image data 124 from the imaging devices 108a . . . 108x or from the computing devices 104a, 104b. In some embodiments, the scheduler 128 continuously monitors a utilization percentage for each core in the data processing engine 120 using a daemon that collects the information about the core and checks the core consumption for all the cores available. For example, scheduler 128 can detect whether one or more of the cores 132a . . . 132x is underutilized and whether one or more of the cores 132a. 132x is overloaded. Further, the scheduler 128 may monitor image data 124 received by the data processing engine 120 and determine I/O unit 129 availability and utilization of the cores 132a . . . 132x.

The I/O unit 129 can communicate with the data store 106 and with the memory 122 (e.g., non-volatile memory, hard disk drive, optical disk, solid state disk, flash memory). In some embodiments, the I/O unit 129 may be incorporated into at least a portion of the memory 122 (e.g., at least a portion of ROM) and may facilitate the transfer of information between elements within the data processing engine 120. The I/O unit can also communicate with the computing devices 104a, 104b over the network 102.

Display unit 133 of data processing engine 120 may be an electronic display configured to display a user interface (e.g., a graphical user interface). For example, the display unit 133 may display one or more visualizations associated with one or more inspections of one or more cores 132a . . . 132x of one or more of the processors 130a . . . 130x of the data processing engine 120. For example, the display unit 133 may be a liquid crystal display (LCD) screen or another type of output that can provide the one or more visualizations associated with the one or more inspections of the one or more cores. In some embodiments, the one or more visualizations are displayed on the display unit 133, a display of computing device 104a, a display of computing device 104b, another display, or one or more combinations thereof.

Based on the data processing engine 120 receiving the image data 124 (e.g., the image data 112a . . . 112x from imaging devices 108a . . . 108x), the data processing engine 120 may initiate a first inspection (e.g., an inspection cycle such as inspection cycle 201 of FIG. 2) of a first core 132a. The first inspection may be an inspection cycle including inspections of tasks executed by the first core 132a upon image data 112a received from the first imaging device 108a. Additional inspections, of the first core 132a and inspections of the other cores 132b . . . 132x corresponding to one or more of processors 130a . . . 130x, may be initiated. As another example, a second inspection cycle can be initiated, the second inspection cycle including inspections of tasks executed by the first core 132a upon image data 112b received from the second imaging device 108b. As another example, a third inspection cycle can be initiated, the third inspection cycle including inspections of tasks executed by a second core 132b upon image data 112c received from a third imaging device 108c. In yet another example, a plurality of inspection cycles can be initiated, the plurality of inspection cycles including inspections of tasks executed by core 132a of another processor 130x upon image data 112e received from imaging device 108e.

In embodiments, an inspection cycle corresponds to an imaging device 108a . . . 108x and the image data 112a . . . 112x received from the corresponding imaging device. In some embodiments, a plurality of inspection cycles for the first core 132a is initiated. Continuing the example, each of the plurality of inspection cycles of the first core 132a may include a plurality of tasks executed by the first core 132a. For example, a first inspection cycle of a first core may include an inspection of a processing task executed by the first core on a first set of image data from a first imaging device, and an inspection of an idle period after the processing task and before a subsequent inspection cycle. Continuing the example, a second cycle of the first core may also include an inspection of a processing task executed by the first core on a second set of image data from a second imaging device, and an inspection of an idle period after the processing task and before a subsequent inspection cycle. In some embodiments, pre-processing of the image data is also inspected during the inspection cycle. For example, pre-processing of the image data may include partitioning the image data (e.g., into blocks of equal sizes) for processing, demosaicing the image data, filtering the image data, calibrating the image data, localizing the image data, image sampling, standardizing the image data into one or more formats, rescaling image data, labeling the image data, organizing the image data, another type of pre-processing task, or one or more combinations thereof.

In embodiments, initiating a plurality of inspections on the same core can minimize overlap in the time domain. Additionally, initiating a plurality of inspections on the same core can provide additional details and insight to the utilization of the one or more of the cores 132a. 132x (e.g., for one or more of processors 130a . . . 130x), as well as providing more accurate data on the utilization of the one or more of the cores 132a . . . 132x (e.g., for one or more of processors 130a . . . 130x) and the I/O unit 129 capacity. Further, one or more unexpected events can be identified based on the plurality of inspections on the same core. In some embodiments, the unexpected event can be identified based on an inspection of a first core executing tasks on a first set of image data from a first imaging device. Additionally or alternatively, the unexpected event can be identified based on an inspection of the first core executing tasks on a second set of image data from a second imaging device. In some embodiments, the unexpected event can be identified based on an inspection cycle of a first core and an inspection cycle of a second core. Continuing the example, the first and second core may be part of the same processing unit, and in other embodiments, the first and second core may be part of different processing units.

In some embodiments, one or more unexpected events can be identified based on one or more inspection cycles of a plurality of cores (e.g., two or more of cores 130a . . . 130x) of one or more of processors 130a . . . 130x. For example, an unexpected event may include one or more of jitter during one or more tasks of an inspection cycle for one or more cores, jitter during one or more portions of an inspection cycle, a particular task having a duration above a threshold duration determined from prior inspection cycles of the same core, an inspection cycle duration above a threshold inspection cycle duration determined from prior inspection cycles, an idle period above a threshold idle period determined from prior inspection cycles, an unexpected delay between tasks, an unexpected delay between inspection cycles, another type of unexpected event, or one or more combinations thereof.

In some embodiments, the one or more visualizations are provided for display on the display unit 133, a display of computing device 104a, a display of computing device 104b, or one or more combinations thereof. The one or more visualizations are provided based on the one or more inspections and the one or more identified unexpected events. In some embodiments, the visualization of the inspection cycle may include an inspection of a grabbing task, such as packet inspection, traffic inspection, another type of grabbing task inspection, or one or more combinations thereof. In some embodiments, the visualization includes a first inspection cycle including an indication of an initiation of a pre-processing task and processing task executed by a first core 132a on a first set of image data 112a from a first imaging device 108a.

Additionally, the visualization may also include a second inspection cycle of the first core 132a including a processing task duration of a second set of image data 112b from a second imaging device 108b. Continuing the example, the visualization may also include an indication of a start time for the processing task of the second set of image data. Further, the visualization may also include inspections of a second core 132b during an inspection cycle of a third set of image data 112c from a third imaging device 108c. Furthermore, the visualization may also include yet another inspection cycle of the second core 132b while executing image data 112d received from a fourth imaging device 108d, as well as a subsequent inspection cycle of the image data 112d. In embodiments, the one or more identified unexpected events displayed within the visualization may correspond to one or more of the inspections of the first core 132a, one or more inspections of the second core 132b, one or more inspections of another core, or one or more combinations thereof. In some embodiments, the first core 132a and second core 132b have the same processor.

In some embodiments, at least one inspected task for each inspection cycle is indicated within the visualization. A task, such as a grabbing task for example, may include the transfer of image data 112a . . . 112x from an imaging device 108a . . . 108x to processor memory 122. The grabbing task may include an exposure time, an image data transfer time from an imaging device to a core, an image data transfer time from an imaging device to memory (e.g., memory 122 of data processing engine 120), or one or more combinations thereof. Another example of a task includes a pre-processing task, such as calibrating the image data, filtering the image data, other methods of image data pre-processing, or one or more combinations thereof. In embodiments, a processing task may include applying a multithreaded color image processing algorithm utilizing a fuzzy technique and edge detection to pixel data of the image data, applying a color tracking algorithm to the image data, applying a motion tracking algorithm to the image data, applying a face detection algorithm to the image data, applying a shape detection algorithm to the image data, another type of processing task, or one or more combinations thereof. In some embodiments, each inspection cycle within the visualization includes an indication of a start time for an idle period, an indication of the duration of the idle period, an indication for another type of task, or one or more combinations thereof.

Figure 2:
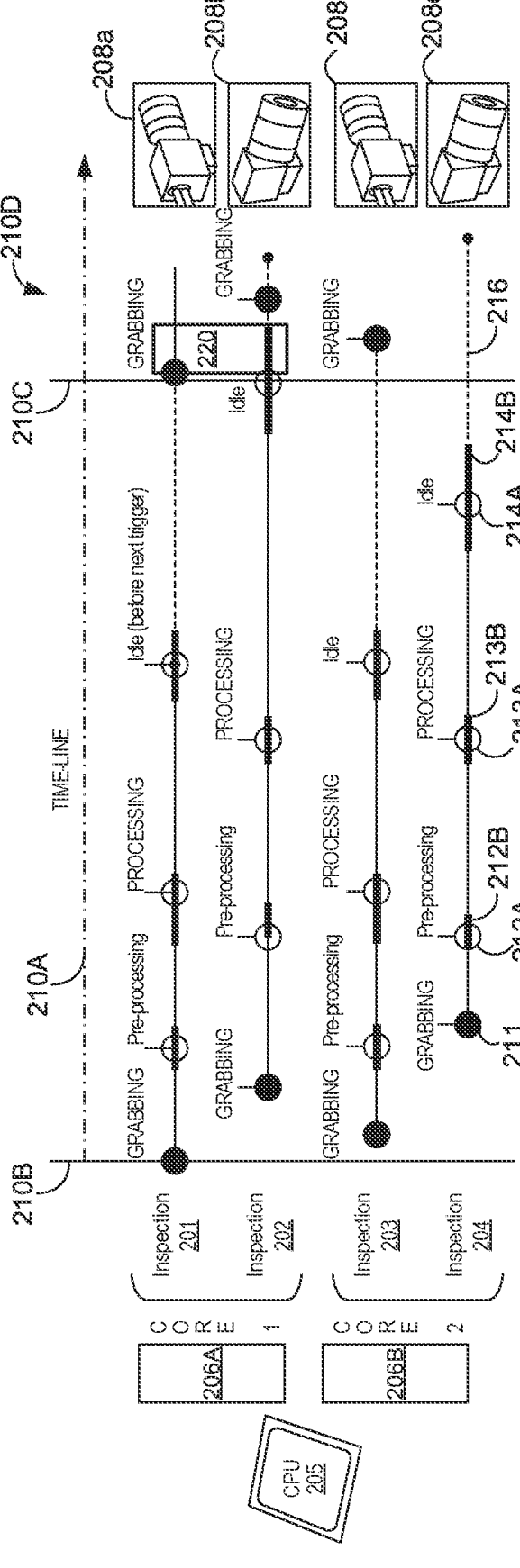
FIG. 2 is an example display of a visualization including inspection cycles of a first core and inspection cycles of a second core, the inspection cycles including tasks associated with each core executing the tasks on image data from an imaging device, in accordance with an embodiment of the present disclosure.

FIG. 2 illustrates example visualization 200 of the inspections cycles 201 and 202 corresponding to a first core 206A ("core 1"), and inspection cycles 203 and 204 corresponding to a second core 206B ("core 2") of CPU 205. Cores 206A, 206B may be different cores of a dual-core processor or other multi-core processor.

Visualization 200 of the inspection cycles 201, 202, 203, and 204 includes inspection tasks (e.g., a grabbing task, a pre-processing task, a processing task, and an idle time) executed by first core 206A ("core 1") and second core 206B ("core 2") on imaging data from the multiple imaging devices 208a, 208b, 208c, and 208d. For example, first inspection cycle 201 of first core 206A corresponds to image data from a first imaging device 208a, second inspection cycle 202 of first core 206A corresponds to image data from a second imaging device 208b, third inspection cycle 203 of second core 206B corresponds to image data from a third imaging device 208c, and fourth inspection cycle 204 of second core 206B corresponds to image data from a fourth imaging device 208b. Example visualization 200 comprises two inspection cycles (first inspection cycle 201 and second inspection cycle 202 of first core 206A) and two inspection cycles (third inspection cycle 203 and fourth inspection cycle 204 of second core 206B). In some embodiments, CPU 205 comprises a multicore processor (e.g., processors 130a . . . 130x of FIG. 1; multicore processor 400 of FIG. 4) comprising first core 206A and second core 206B of FIG. 2. While two cores are described in this example, it is recognized that CPU 205 may include additional cores (e.g., a quad-core processor, etc.) with their corresponding inspection cycles for processing image data received from any number imaging devices. As an example, the CPU 205 may be part of a machine vision processor device, such as the MX-E Series of vision processors available from Datalogic of Bologna, Italy, or other similar devices. CPU 205 may also be incorporated within any number of different computing devices used for analyzing data from multiple sensors and input devices.

As illustrated in example visualization 200, timeline 210A includes a snapshot showing a starting point 210B and an ending point 210C within which a group of inspection cycles corresponding to each of the imaging devices 208a-208d are performed. Each inspection cycle begins with an acquisition (i.e., "grab") of image data, followed by a pre-processing task, a processing task, and an idle period while waiting for the next trigger or acquisition of image data.

The starting point 210B of this timeline corresponds to the first occurring acquisition (grab) of data for the group, which in this example is from the first imaging device 208a and part of the first inspection cycle 201 performed by the first core 206A. The ending point 210C of this timeline of inspection cycles corresponds to the last occurring processing task completion (also represented by the start of an idle period) for the group, which in this example is part of the second inspection cycle 202 performed by the first core 206A. In some embodiments, the completion of the final task for an inspection cycle may be the completion of an idle period after a processing task. Further, the ending point 210C of the group inspection cycles 201, 202, 203, and 204 may advantageously occur, with respect to timeline 210A, before the initiation of a subsequent grabbing task of a subsequent inspection cycle, the subsequent inspection cycle corresponding to portion 210D of timeline 210A. Each of the inspection cycles 201, 202, 203, and 204 includes a grabbing task that occurs at the initial acquisition 210B (as in the case of first inspection cycle 201 in FIG. 2) of the inspection cycles or thereafter (as in the case of inspection cycles 202, 203, 204 in FIG. 2).

For example, the first inspection cycle 201 of first core 206A corresponds to image data from a first imaging device 208a and includes inspections of a grabbing task, a pre-processing task, a processing task, and an idle period during portion 210A of the timeline before the subsequent grabbing task of a subsequent inspection cycle during portion 210D of the timeline. In some embodiments, the subsequent inspection cycle corresponding to portion 210D is associated with different imaging data from the first imaging device 208a. In other embodiments, this subsequent inspection cycle is associated with at least a portion of the same imaging data from the first imaging device 208a.

Second inspection cycle 202 of first core 206A corresponds to image data from a second imaging device 208b and includes inspections of a grabbing task, a pre-processing task, a processing task, and an idle period during portion 210A of the timeline before the subsequent grabbing task of a subsequent inspection cycle corresponding to image data from the second imaging device 208b during portion 210D of the timeline. In some embodiments, the subsequent inspection cycle corresponding to portion 210D is associated with different imaging data from the second imaging device 208b. In other embodiments, this subsequent inspection cycle is associated with at least a portion of the same imaging data from the second imaging device 208b.

Third inspection cycle 203 of second core 206B corresponds to image data from a third imaging device 208c and includes inspections of a grabbing task, a pre-processing task, a processing task, and an idle period during portion 210A of the timeline before the subsequent grabbing task of a subsequent inspection cycle during portion 210D of the timeline. In some embodiments, this subsequent inspection cycle during portion 210D is associated with at least a portion of the same imaging data from the third imaging device 208c. In other embodiments, this subsequent inspection cycle during portion 210D is associated with different imaging data from the third imaging device 208c.

Fourth inspection cycle 204 of second core 206B corresponds to image data from a fourth imaging device 208d and includes inspections of a grabbing task, a pre-processing task, a processing task, and an idle period before the subsequent grabbing task of a subsequent inspection cycle of second core 206B. In some embodiments, this subsequent inspection cycle during portion 210D is associated with at least a portion of the same imaging data from the fourth imaging device 208*d*. In other embodiments, this subsequent inspection cycle during portion 210D is associated with different imaging data from the fourth imaging device 208*d*.

Alternatively, other visualization embodiments may include more than two inspection cycles of first core 206A, more than two inspection cycles of second core 206B, additional inspection cycles of other cores, or one or more combinations thereof. For example, in some embodiments, the visualization includes two inspection cycles executed by first core 206A on the imaging data from imaging device 208*a*. As another example, in other embodiments, first core 206A and second core 206B correspond to different multi-processors.

The grabbing tasks of the different inspection cycles may occur at different times relative to each other. In example visualization 200 of FIG. 2, the grabbing task of third inspection cycle 203 occurs on the timeline 210A before the grabbing tasks of inspection cycles 202 and 204. Furthermore, the grabbing task of second inspection cycle 202 occurs on the timeline 210A before the grabbing task of fourth inspection cycle 204. In other embodiments, the grabbing tasks of the inspections 201, 202, 203, and 204 may occur at different instances on the timeline relative to each other than what is shown. Additionally, the subsequent grabbing task of subsequent inspection cycle corresponding to timeline portion 210D and first inspection cycle 201 occurs prior to the subsequent grabbing task corresponding to second inspection cycle 202. In addition, the subsequent grabbing task corresponding to timeline portion 210D and third inspection cycle 203 occurs prior to the subsequent grabbing tasks corresponding to inspection cycles 202 and 204. That is, dashed line 216 extends beyond the subsequent grabbing task corresponding to third inspection cycle 203 and timeline portion 210D. In addition, the dashed line depicted for subsequent inspection cycle corresponding to second inspection cycle 202 and timeline portion 210D extends after the subsequent grabbing task, which is different from the other three subsequent inspection cycles.

For convenience, elements of the fourth inspection cycle 204 are labeled with reference numerals and described but it should be recognized that the other inspection cycles 202, 203, 204 include similar elements not specifically labeled with reference numerals. In example visualization 200, and with reference to the fourth inspection cycle 204, the grabbing task initiates at point 211 on the timeline, the pre-processing task initiates at point 212A on the timeline, the processing task initiates at point 213A on the timeline, and the idle period initiates at point 214A on the timeline. In embodiments, the circle symbol indicators of visualization 200 indicate a start time of the corresponding task of the inspection cycles with the duration of the task itself being the time period before the next circle symbol. Stated differently, the duration (e.g., time period) of a grabbing task (e.g., the duration in which first core 206A or second core 206B receives image data from one or more of imaging devices 208*a*-208*d*) begins on the timeline 210A at the solid circle symbol and completes before the pre-processing open circle symbol.

As described above, an inspection of the grabbing task is completed before initiating the pre-processing task, an inspection of the pre-processing task is completed before initiating the processing task, and inspection of the processing task is completed before initiation of the idle period. For example, a duration of the inspection of the pre-processing task for inspection cycle 204 includes the start time for the pre-processing task initiating at point 212A up to the start time for the processing task initiating at point 213A. The completion of an inspection cycle 201, 202, 203, and 204 is based on a start time of the corresponding idle period, the duration of the idle period, initiation of a subsequent task (e.g., a grabbing task corresponding) of a subsequent inspection cycle. For example, the first inspection cycle 201 for the image data captured by the first imaging device 208*a* is completed with its idle period until a subsequent inspection cycle begins with grabbing new image data (e.g., frame) from the first imaging device 208*a*. Likewise, the first inspection cycle 202 for the image data captured by the second imaging device 208*b* is completed with its idle period until a subsequent inspection cycle begins with grabbing new image data (e.g., frame) from the second imaging device 208*b*. The third inspection cycle 203 for the image data captured by the third imaging device 208*c* is completed with its idle period until a subsequent inspection cycle begins with grabbing new image data (e.g., frame) from the third imaging device 208*c*. The fourth inspection cycle 204 for the image data captured by the fourth imaging device 208*d* is completed with its idle period until a subsequent inspection cycle begins with grabbing new image data (e.g., frame) from the fourth imaging device 208*d*.

The group of inspection cycles 201, 202, 203, 204 occur during portion 210A of the timeline with a completion point 210C for the group being defined as the point at which the last inspection cycle enters its idle period. This this case, the last inspection cycle to enter its idle period is the second inspection cycle 202 as shown in FIG. 2. As depicted in example visualization 200, the idle periods of inspections cycles 201 and 203 have longer durations, before the group inspection cycle completion point 210C, than the idle periods of inspection cycles 202 and 204. For example, the duration of the idle period is indicated by the idle period circles and dashed lines (e.g., dashed line 216) in visualization 200. In addition, it is noted that the duration of the idle periods associated with inspection cycles 202, 203, 204 continue into the portion 210D of timeline 210A that is after the group completion point 210C indicating that the subsequent grabbing step for the subsequent inspection cycles is delayed relative to the initial grabbing from the first imaging device 208*a*. These grabbing delays are similar to the delays shown at the beginning of the first group within portion 210A of the timeline.

Further, inspection cycles 201, 202, 203, and 204 each include standard error bars associated with the start time for each inspection task. For example, with reference to the fourth inspection cycle 204, the visualization includes a pre-processing standard error bar (e.g., pre-processing standard error bar 212B), a processing standard error bar (e.g., processing standard error bar 213B), and an idle period standard error bar (e.g., idle period standard error bar 214B). (The standard error bars and task initiations are only labeled in inspection cycle 204 for the sake of clarity within example visualization 200.) The standard error bars are generated based historical analysis of inspection cycles on image data from the imaging devices 208*a*-208*d* to determine standard errors for each task start time corresponding to a fixed framerate (e.g., 60 fps). For example, in some embodiments, the image data generated by imaging devices 208*a* and 208*b* have the same fixed framerate and the image data generated by imaging devices 208*c* and 208*d* have the same fixed framerate for example visualization 200. As another example, in some embodiments, each of the image data generated by the imaging devices 208*a*-208*d* correspond to the same fixed framerate.

A pre-processing standard error bar is determined based on the pre-processing inspection (e.g., from the pre-processing task initiation at 212A and until the processing task start time at 213A for inspection cycle 204) compared to historical pre-processing inspections (e.g., executed by second core 206B on image data from imaging device 208*d*). For example, the pre-processing standard error bar can be determined based on one or more of: an average duration of the historical pre-processing inspections and standard deviation of the current duration, an average start time (e.g., relative to timeline 210A) of the historical pre-processing inspections and standard deviation of the current start time, or one or more combinations thereof. In some embodiments, a pre-processing task executed by a core may include demosaicing, filtering, calibrating (e.g., high speed image calibration using a brightness calibration algorithm, lens distortion correction, real-time re-calibration), localizing, image sampling, modification of calibration metadata, other types of preprocessing of the image data from an imaging device, or one or more combinations thereof.

In embodiments, each standard error bar is a graphical representation of the variability of a current task start time and/or a current task duration associated with a corresponding average. For example, processing standard error bars of inspection cycles 202 and 204 indicate that the predictability of the processing tasks inspections executed by first core 206A and second core 206B on imaging data from imaging devices 208*b* and 208*d* is greater than the predictability of the processing tasks of inspections executed by first core 206A and second core 20B on imaging data from imaging devices 208*a* and 208*c*, since the processing standard error bars of inspection cycles 202 and 204 are shorter than the processing standard error bars of inspection cycles 201 and 203. In some embodiments, a processing task executed by a core may include image data processing via one or more image data processing algorithms corresponding to, but not limited to, feature selection, pair matching using reference images, designation of matching points, determining most frequently used points, another image data processing technique (e.g., machine vision techniques, barcode decoding algorithms, optical character recognition (OCR), machine learning, artificial intelligence, etc.), or one or more combinations thereof.

In some embodiments, visualization 200 includes an indication (e.g., a textual notification, warning symbol, or other alert) that a standard error bar (e.g., pre-processing standard error bar 212B, processing standard error bar 213B, idle period standard error bar 214B) is longer than a predetermined threshold. For example, a pre-processing task, processing task, or idle period may have a start time or duration that falls outside of a particular range associated with a corresponding average and standard deviation. Continuing the example, the idle period duration or start time associated with inspection cycle 204 may fall outside an average start time or an average duration of historical idle period inspections of second core 206B executions upon image data from imaging device 208*d*. As such, visualization 200 may include an indication that idle period standard error bar 214B is longer than a predetermined threshold. This indication is associated with a high level of unpredictability of the idle period prior to the subsequent grabbing task executed by second core 206B for the next inspection cycle associated with the image data from imaging device 208*d*. In some embodiments, the high level of unpredictability of the idle period is an unexpected event. In some embodiments, the unexpected event 220 shown in visualization 200 is identified based on an idle time duration extending beyond a subsequent grabbing task of a subsequent inspection cycle, a start time of a subsequent grabbing task of a subsequent inspection cycle occurring after a predetermined start time, a start time of a subsequent grabbing task occurring beyond a predetermined time range, an idle time duration exceeding a threshold, or one or more combinations thereof.

In some embodiments, the position of one or more of the standard error bars is centered based on a corresponding average. For example, the position of processing standard error bar 213B can be positioned based on an average start time of historical processing inspections by second core 206B on the image data from imaging device 208*d*. As another example, the positioning of idle period standard error bar 214B can be based on an average start time of historical idle period inspections by second core 206B on the image data from imaging device 208*d*. Continuing the example, the idle period standard error bar 214B can also be positioned based on the idle period initiation at 214A associated with timeline 210A. Furthermore, in some embodiments, an average start time (e.g., for the pre-processing, the processing, or the idle period) for an inspection cycle corresponding to an imaging device may dynamically change over time as first core 206A or second core 206B additionally receive image data from an imaging device. As such, one or more of the standard error bars within visualization 200 can be dynamically updated based on the one or more changes to a corresponding average start time.

In some embodiments, a load factor of the system may be determined using loading factors from each core of the system. For example, a load factor may be determined for each inspection, and the load factors from each inspection cycle may be used to determine the load factor for each core. Continuing the example, the load factor for each inspection may be determined based on a comparison of a duration of an inspection of a task (e.g., an inspection of a processing task) and the idle period. For example, a ratio between the duration of the inspection of a pre-processing task and idle period may be determined, and the ratio may be used to determine one or more load factors for the inspection cycle. In other embodiments, the example visualization 200 may include a load factor for one or more inspection cycles, one or more cores, for the system comprising the cores, or one or more combinations thereof.

In some embodiments, an idle period or idle period standard error bar of an inspection cycle may be used to identify one or more unexpected events of the system comprising first core 206A and second core 206B, such as a jitter in the duration of executing a task, for example. For example, the unexpected event 220 is identified based on the inspection cycle 202 including an idle period standard bar that is longer than the idle period standard bar of first inspection cycle 201. Additionally, the idle period of second inspection cycle 202 initiates at a later time than the idle period initiation of first inspection cycle 201. In some embodiments, the idle period of second inspection cycle 202 starts at time on the timeline 210A that is above a predetermined threshold. For example, the predetermined threshold can be based on historical idle period start times for first core 206A inspection cycles associated with image data from second imaging device 208*b*. Furthermore, the unexpected event can be identified based on the duration of the idle period of second inspection cycle 202 continuing after the subsequent grabbing task of second inspection cycle 202. As such, example visualization 200 includes a notification of the unexpected event 220.

In other embodiments, example visualization 200 may also include further details of the task inspections associated with the inspection cycles and the image data received from the one or more imaging devices. For example, a time (e.g., in μs) associated with executing one or more of the grabbing task, pre-processing task, processing task, or idle period can be displayed on visualization 200. Additionally or alternatively, a sub-task for each task (e.g., a "pass-fail" task, a "buffering" task, or a particular type of filtering task) can be displayed within the visualization 200. In some embodiments, the total inspection time for an entire inspection cycle of a core of the system can be displayed. In some embodiments, a highest inspection time (e.g., corresponding to a particular inspection cycle or task, such as "pre-processing," for example) may be displayed within visualization 200. Additionally or alternatively, a lowest inspection time can also be displayed. In some embodiments, a highest and lowest inspection time of inspection times for one or more inspection cycles can be displayed within the visualization 200.

Figure 3:
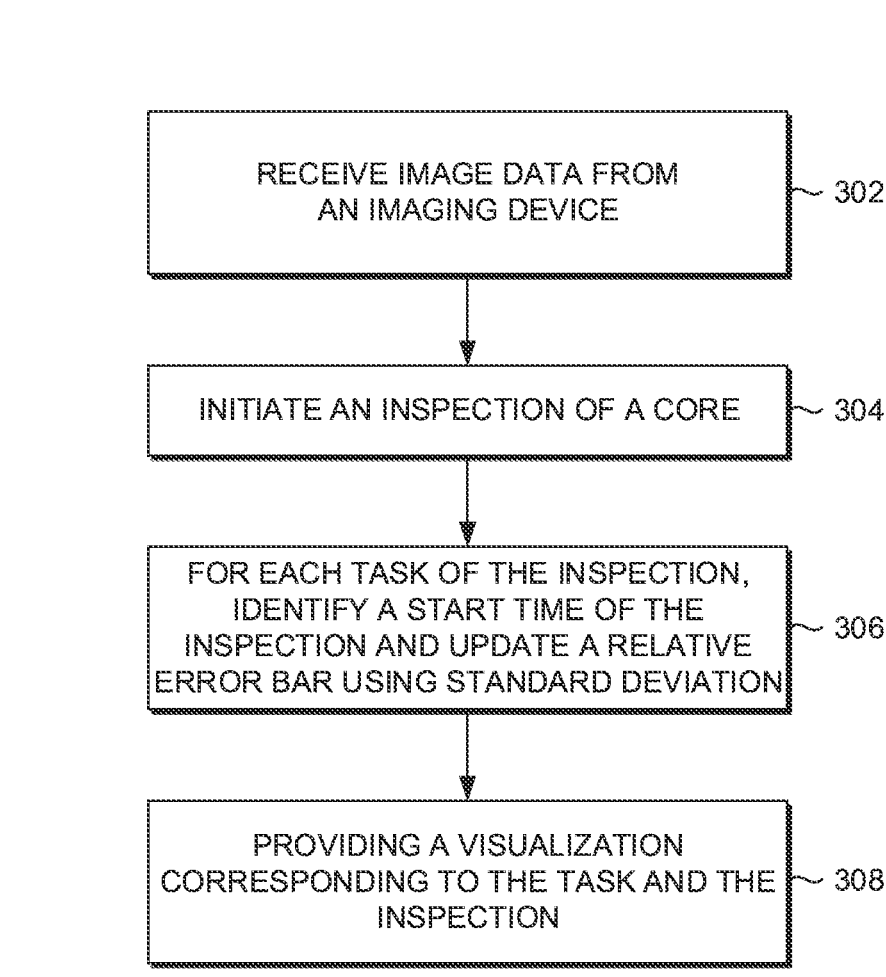
FIG. 3 is an example method for providing one or more visualizations for inspection cycles of cores, in accordance with an embodiment of the present disclosure.

FIG. 3 includes example method 300 for providing one or more visualizations of tasks executed by a core on image data from an imaging device. At 302, image data (e.g., image data 112a . . . 112x of FIG. 1) is received from an imaging device (e.g., imaging devices 108a . . . 108x of FIG. 1; imaging devices 208a, 208b, 208c, 208d of FIG. 2; or imaging device 500 of FIG. 5). In an embodiment, at least one of a plurality of imaging devices transmitting the image data is an optical character recognition device. In an embodiment, the image data is received by a system (e.g., data processing engine 120 of FIG. 1). In some embodiments, the system comprises one or more cores and one or more computer storage memory having computer-executable instructions stored thereon that, when executed by the one or more cores, cause the one or more cores to receive the image data. In some embodiments, the number of the imaging devices is greater than the number of the one or more cores receiving the image data.

At 304, an inspection of the one or more cores is initiated based on receiving the image data. In an embodiment, a first inspection is initiated for a first core executing operations on imaging data from a first imaging device. Further, a second inspection can be initiated for the first core executing operations on imaging data from a second imaging device. In addition, one or more additional inspections can be initiated for one or more additional cores executing operations on imaging data from one or more additional imaging devices. In some embodiments, the first inspection, the second inspection, the one or more additional inspections, or one or more combinations thereof is an inspection cycle that includes at least a processing task and an idle period. In some embodiments, additional image data is received by one or more cores of the system from one or more imaging devices upon generation of the one or more inspection cycles.

In an embodiment, the system includes a CPU, which includes the cores processing the image data from each of the plurality of imaging devices, wherein the cores process the image data in parallel. In some embodiments, a plurality of inspections may be initiated for each of a plurality of cores of the CPU. In some embodiments, the system includes a plurality of CPUs, and a plurality of inspection cycles may be initiated for each of a plurality of cores for each of the plurality of CPUs. In some embodiments, the image data received by the system and from the plurality of imaging devices corresponds to images that are each captured at a predetermined framerate by each of the plurality of imaging devices.

At 306, a start time is identified for each task of each inspection cycle. For example, the tasks for each inspection cycle may include a grabbing task, a pre-processing task, a processing task, an idle period, another type of task, or one or more combinations thereof. In one embodiment, a start time is determined for the processing task and the idle period for the first inspection cycle and the second inspection cycle. Further, in some embodiments, an average start time is also determined for historical processing tasks executed by the first core on the image data received by the first imaging device. In addition, an average start time is also determined for historical processing tasks executed by the first core on the image data received by the second imaging device. Further, an average start time can be determined for historical processing tasks executed by a second core on the image data received by a third imaging device. In some embodiments, other average start times for other historical tasks executed by a core on image data from an imaging device can also be determined.

In some embodiments, a duration is determined for the processing task and the idle period for one or more of the inspection cycles. Further, in some embodiments, an average duration is also determined for historical processing tasks executed by the first core on the image data received by the first imaging device. In addition, an average duration is also determined for historical processing tasks executed by the first core on the image data received by the second imaging device. Further, an average duration can be determined for historical processing tasks executed by a second core on the image data received by a third imaging device. In some embodiments, other average durations for other historical tasks executed by a core on image data from an imaging device can also be determined.

Further, a standard deviation for one or more of the start times or durations of the inspection cycles can be determined. For example, a standard deviation for the start time of a processing task of a first inspection cycle can be determined based on an average start time for historical processing tasks executed by the first core on the image data received by the first imaging device. As another example, a standard deviation for the duration of a processing task of a second inspection cycle can be determined based on an average start time for historical processing tasks executed by the first core on the image data received by the second imaging device. In yet another example, a standard deviation for the duration of an idle period of third second inspection cycle can be determined based on an average duration for historical idle periods executed by the second core on the image data received by the third imaging device.

In addition, at 306, a standard error bar is generated for the pre-processing task, the processing task, and the idle period of each inspection cycle. For example, standard error bar for the processing task and the idle period can be generated based on the standard deviation for the start time of the processing task and the standard deviation for the start time of the idle period. As another example, the standard error bar for the processing task and the idle period can be generated based on the standard deviation for the duration of the processing task and the standard deviation for the duration of the idle period. In some embodiments, the standard error bars are dynamically updated. For example, in one embodiment, additional image data is received, and additional inspection cycles are generated based on the additional image data. In one embodiment, an updated standard deviation for the start time of the processing task and the idle period for the first inspection cycle is updated based on one or more additional inspection cycles. As such, the standard error bar for the processing task and idle period of the first inspection cycle is updated. In another embodiment, the standard deviation for the duration of the processing task and the idle period are updated based on the additional inspection cycle, and the corresponding standard error bars of the first inspection cycle are updated based on those updated standard deviations.

In some embodiments, one or more unexpected events are identified for one or more of the inspection cycles. For example, one or more unexpected events can be identified based on one or more idle period standard error bars, one or more pre-processing standard error bars, one or more processing standard error bars, one or more updated standard error bars, or one or more combinations thereof. For example, in one embodiment, an unexpected event is identified based on a first idle period standard error bar being longer than a predetermined threshold. As another example, an unexpected event can be identified based on an idle period standard error bar being longer than a threshold number of idle period standard error bars of other inspection cycles. In yet another example, an unexpected event can be identified based on a subsequent grabbing task of an inspection cycle, wherein the subsequent grabbing task is initiated above a threshold start time. In some embodiments, a grabbing task includes a transfer of the image data from a first imaging device of a plurality of imaging devices to a first core of the one or more cores. In some embodiments, a grabbing task of a second inspection cycle includes a transfer of the image data from a second imaging device to processor memory of a data processing engine.

At 308, a visualization is provided via a user interface (e.g., a graphical user interface of a computing device). In some embodiments, the visualization includes one or more inspection cycles (e.g., first inspection cycle 201 and second inspection cycle 202 of FIG. 2) of a first core. In some embodiments, the visualization includes one or more inspection cycles (e.g., third inspection cycle 203 and fourth inspection cycle 204 of FIG. 2) of a second core. In some embodiments, the first core and the second core both correspond to the same CPU. In some embodiments, the visualization also includes the unexpected event (e.g., unexpected event 220 of FIG. 2). The visualization, in some embodiments, is visualization 200 of FIG. 2.

In some embodiments, the visualization of the first inspection and the second inspection of the first core is provided based on a time associated with transferring the image data from each of the first imaging device and the second imaging device to the one or more computer storage memory. For example, the visualization may include a grabbing task for the first inspection cycle and the second inspection cycle, and the grabbing task for each inspection cycle may correspond to a transfer time associated with the first core receiving the image data from the imaging device associated with the inspection cycle. As another example, the grabbing task within the visualization can correspond to a transfer time associated with computer storage memory (e.g., computer storage memory of data processing engine 120 of FIG. 2) receiving the image data from the imaging device associated with the inspection cycle.

In some embodiments, the visualization includes indications of a start time and duration for a pre-processing task for each inspection cycle within the visualization. Continuing the example, the pre-processing tasks (executed by the core on the image data) may include filtering and calibrating the image data received from a corresponding imaging device. In some embodiments, the visualization also includes indications of a start time and duration for a processing task for each inspection cycle within the visualization. In some embodiments, the visualization also includes indications of a start time and duration for an idle period, which are subsequent to the indications for the processing task, for each inspection cycle within the visualization. Further, in some embodiments, each inspection cycle in the visualization includes one or more of: a pre-processing standard error bar, a processing standard error bar, an idle period standard error bar, another type of indication based on historical inspection cycle data, or one or more combinations thereof. Furthermore, in some embodiments, the visualization dynamically updates the standard error bars based on receiving additional image data and initiating additional inspection cycles based on receiving the additional image data.

Example Multicore Processor

Figure 4:
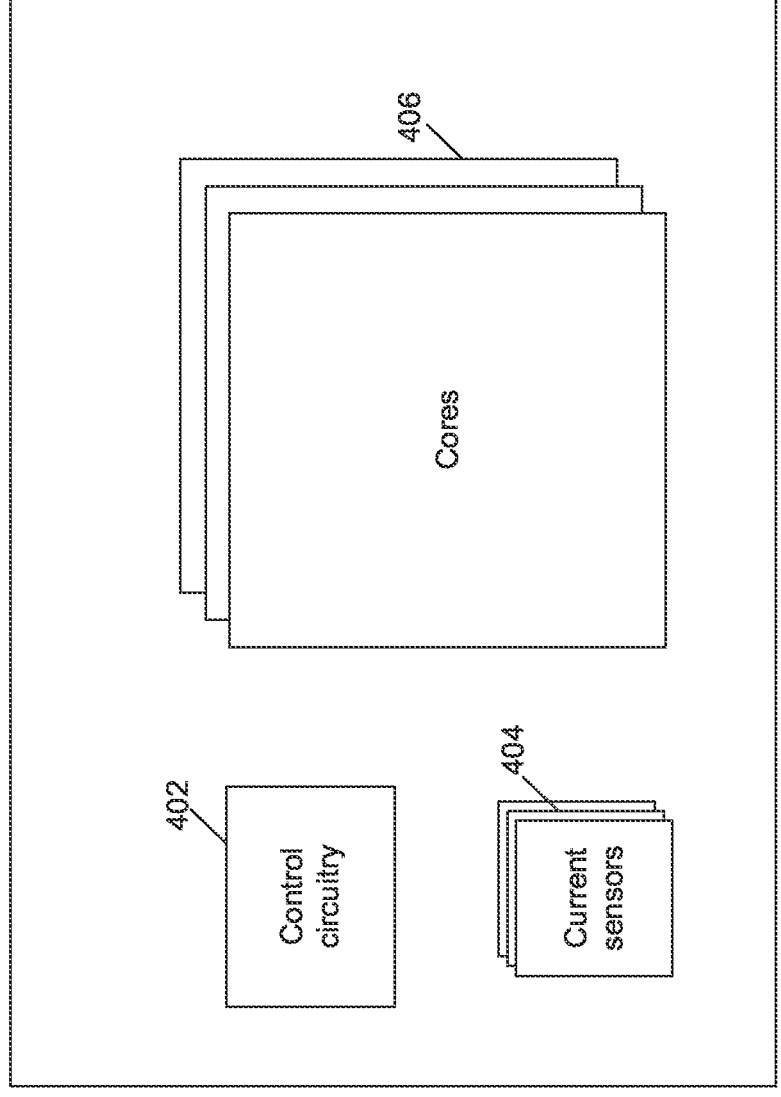
FIG. 4 is a block diagram of an example multicore processor, in accordance with an embodiment of the present disclosure.
Figure 4:

FIG. 4 depicts an example embodiment of a multicore processor 400. Example multicore processor 400 includes a control circuitry 402, current sensors 404, and cores 406. In some embodiments, example multicore processor 400 is one or more of the processors 130a . . . 130x of FIG. 1. In some embodiments, example multicore processor is a system on chip.

The current sensors 404, in some embodiments, may include analog current comparators, other types of current sensors, or one or more combinations thereof. The current sensors 404 may measure current utilization of each of the cores 406. For example, the current sensors 404 may determine whether the current utilization of one or more of the cores 406 is above or below a particular threshold. The control circuitry 402 may locally control the current being utilized by cores 406 by causing the cores 406 to throttle based on measurements from the current sensors 404. The control circuitry 402 may generate a current measurement history for each of the cores 406 based on the measurements from the current sensors 404.

Example Imaging Device

Figure 5:
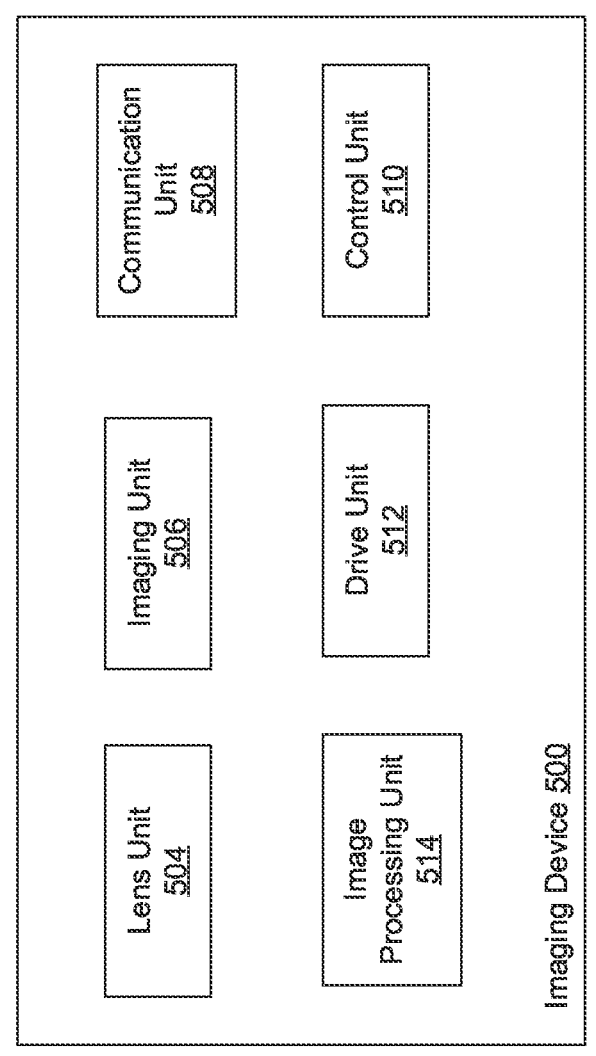
FIG. 5 is a block diagram of an example imaging device, in accordance with an embodiment of the present disclosure.

Having described the example embodiments discussed above, an example imaging device (e.g., imaging devices 108a . . . 108x of FIG. 1; imaging devices 208a, 208b, 208c, 208d of FIG. 2) is described below with respect to FIG. 5. Example imaging device 500 is but one example of a suitable imaging device, and is not intended to suggest any particular limitation as to the scope of use or functionality of the technology disclosed. Neither should example imaging device 500 be interpreted as having any dependency or requirement relating to any particular component illustrated, or a particular combination of the components illustrated in FIG. 5.

Example imaging device 500 comprises a lens unit 504, an imaging unit 506, a communication unit 508, a control unit 510, a drive unit 512, and image processing unit 514.

The lens unit 504 may include one or more lenses, such as a zoom lens and a focus lens for example. Other types of the one or more lenses may include a wide-angle lens, an ultra-wide-angle lens, a telephoto lens, a telescope lens, a periscope-style zoom lens, a fisheye lens, a macro lens, a prime lens, another type of lens, or one or more combinations thereof. In some embodiments, the lens unit 504 is a dual-camera configuration including two types of lenses or a triple-camera configuration including three types of lenses. In other embodiments, the lens unit 504 includes a plurality of coaxially disposed lenses in sequence from an object side to an image side. In some embodiments, the lens unit 504 includes an optical lens and a photosensitive element (e.g., a complementary metal oxide semiconductor or a charge-coupled device) located on the image side of the optical lens.

The imaging unit 506 generates an image signal to provide to the communication unit 508. The imaging unit 506 may be rotated by a rotary motor, in some embodiments. In addition, the imaging unit 506 may be housed in a lens barrel, in some embodiments. The imaging unit 506 may comprise, for example, a complementary metal oxide semiconductor image sensor or another type of image sensor (e.g., image sensors 110a . . . 110x of FIG. 1). For example, the complementary metal oxide semiconductor image sensor may have a Bayer arrangement.

The communication unit 508 is configured for transmitting or receiving various types of information to or from the control unit 510. For example, the communication unit 508 may transmit one or more image signals, received from the imaging unit 506, to the control unit 510 (e.g., via a transmission cable as raw data). As another example, the communication unit 508 may transmit the one or more image signals in real-time or near real-time. In yet another example, the communication unit 508 may transmit optical image signals, which were previously converted from electrical image signals, to the control unit 510.

In embodiments, communication unit 508 may receive control signals to control imaging device 500 or a portion of the imaging device 500 (e.g., a head of a camera imaging device or the lens unit 504) from the control unit 510. For example, the control signals may include data associated with a frame rate, an exposure value, a magnification value, a focal point value, other image data, a white balance value, or one or more combinations thereof. In an embodiment, the drive unit 512 can move the zoom lens and focus lens of the lens unit 504 based on the control signals. In some embodiments, the drive unit 512 may control a duration of light irradiation (e.g., of a solid-state image sensor) and a duration of light shielding based on the control signals.

Image processing unit 514 applies image processing to image signals as raw data is transmitted from the lens unit 504 and the imaging unit 506. Image processing, for example, may include development processing (e.g., demosaic processing), high image quality processing (e.g., band enhancement, super resolution, shake correction), enlargement processing (electronic zoom), using an image enhancement algorithm (e.g., to perform a white balance adjustment), a color adjustment (e.g., color enhancement, color correction, color matrix), color filter array interpolation, noise reduction, sharpening, feature point extraction, face detection, depth map generation, high dynamic range image enhancement, another type of processing, or one or more combinations thereof. In some embodiments, the image processing unit 514 may perform wave detection processing for image signals for performing auto exposure, auto-focus, and auto white balance. The image processing unit 514 may output compressed image data (e.g., JPEG or another format usable for images). The output from the image processing unit 514 may be stored locally or transmitted.

The imaging device 500 has been described as an example. However, a system to which the technology according to the present disclosure is applicable is not limited to this example. For example, in some embodiments, the imaging device 500 comprises a data store. As another example, the image processing unit 514 may be configured by a central processing unit. Continuing the example, the image processing unit 514 may comprise a plurality of cores that perform image processing in parallel. In another example, imaging device 500 is part of a computing device, such as computing device 600 described in FIG. 6.

Example Computing Device

Having described the example embodiments discussed above of the presently disclosed technology, an example operating environment of an example computing device (e.g., computing devices 104a and 104b of FIG. 1) is described below with respect to FIG. 6. Computing device 600 is but one example of a suitable computing environment, and is not intended to suggest any particular limitation as to the scope of use or functionality of the technology disclosed. Neither should computing device 600 be interpreted as having any dependency or requirement relating to any particular component illustrated, or a particular combination of the components illustrated in FIG. 6.

Figure 6:
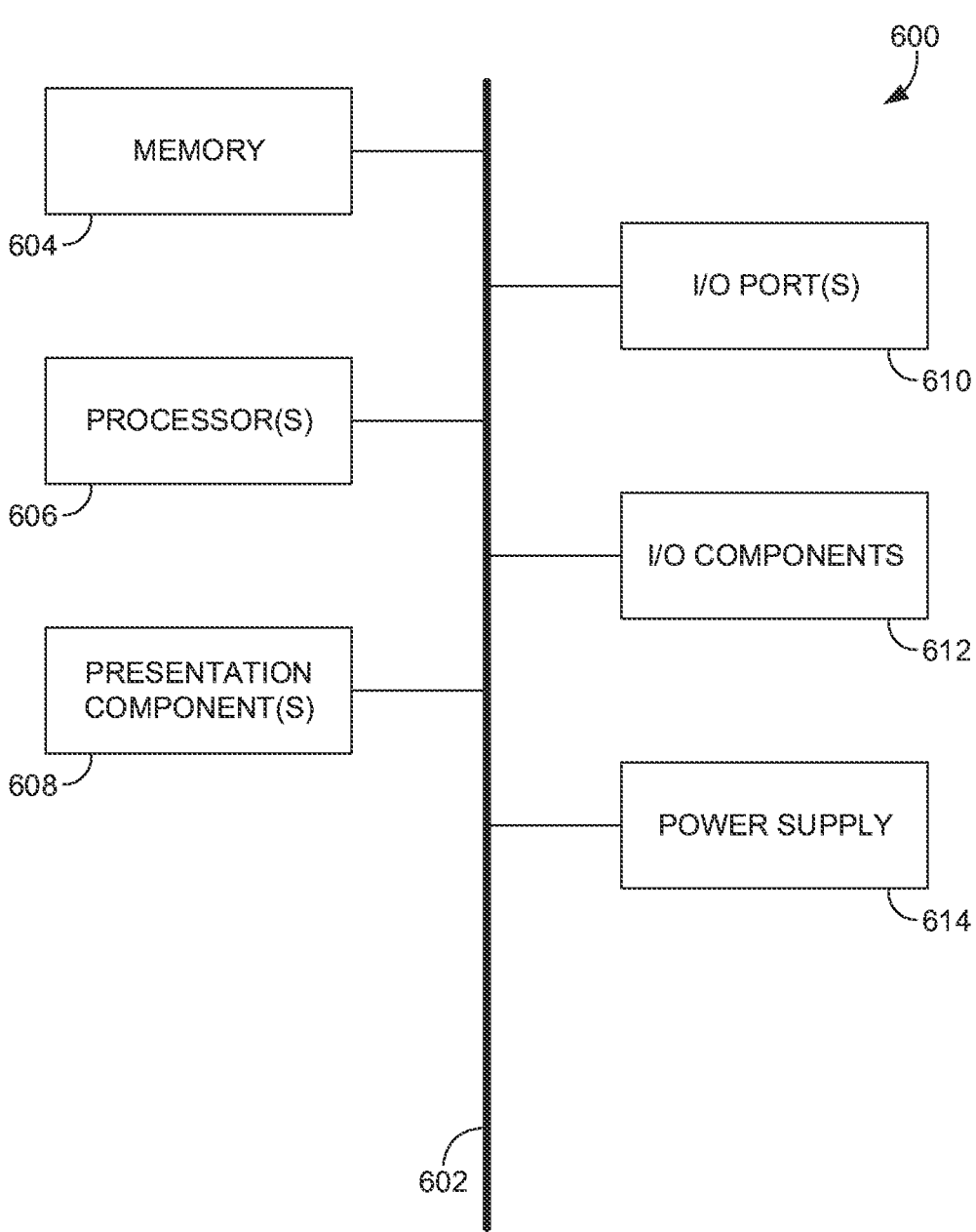
FIG. 6 is a block diagram of an example computing environment suitable for use in implementing aspects of the technology described herein.

As illustrated in FIG. 6, example computing device 600 includes a bus 602 that directly or indirectly couples the following devices: memory 604, one or more processors 606, one or more presentation components 608, one or more input/output (I/O) ports 610, one or more I/O components 612, and a power supply 614.

Bus 602 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component, such as a display device, to be an I/O component. Also, processors have memory. Accordingly, FIG. 6 is merely illustrative of an exemplary computing device that can be used in connection with one or more embodiments of the technology disclosed herein.

Computing device 600 can include a variety of computer-readable media. Computer-readable media can be any available media that can be accessed by computing device 600 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 604 includes computer storage media in the form of volatile and/or nonvolatile memory. The memory 604 may be removable, non-removable, or a combination thereof. Example hardware devices of memory 604 may include solid-state memory, hard drives, optical-disc drives, other hardware, or one or more combinations thereof. As indicated above, the computer storage media of the memory 604 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by computing device 600, or one or more combinations thereof.

The one or more processors 606 of computing device 600 can read data from various entities, such as the memory 604 or the I/O component(s) 612. The one or more processors 606 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multipurpose or specific processor or controller, or one or more combinations thereof. In addition, the one or more processors 606 can execute instructions, for example, of an operating system of the computing device 600 or of one or more suitable applications.

The one or more presentation components 608 can present data indications via computing device 600, another computing device, or a combination thereof. Example presentation components 608 may include a display device, speaker, printing component, vibrating component, another type of presentation component, or one or more combinations thereof. In some embodiments, the one or more presentation components 608 may comprise one or more applications or services on a computing device, across a plurality of computing devices, or in the cloud. The one or more presentation components 608 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof. For example, the one or more presentation components 608 can present a visualization that compares a plurality of inspections of one or more cores of a central processing unit and a visualization of each task of each of the plurality of inspections.

The one or more I/O ports 610 allow computing device 600 to be logically coupled to other devices, including the one or more I/O components 612, some of which may be built in. Example I/O components 612 can include a microphone, joystick, game pad, satellite dish, scanner, printer, wireless device, and the like. The one or more I/O components 612 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 608 on the computing device 600. In some embodiments, the computing device 600 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the computing device 600 may, additionally or alternatively, be equipped with accelerometers or gyroscopes that enable detection of motion. In some embodiments, the output of the accelerometers or gyroscopes may be provided to the one or more presentation components 608 of the computing device 600 to render immersive augmented reality or virtual reality.

The power supply 614 of computing device 600 may be implemented as one or more batteries or another power source for providing power to components of the computing device 600. In embodiments, the power supply 614 can include an external power supply, such as an AC adapter or a powered docking cradle that supplements or recharges the one or more batteries. In aspects, the external power supply can override one or more batteries or another type of power source located within the computing device 600.

In embodiments, the computing device 600 may be a wireless terminal adapted to receive communications and media over various wireless networks. Computing device 600 may communicate using one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the computing device may facilitate communication via radio frequency signals, frames, blocks, transmission streams, packets, messages, data items, data, another type of wireless communication, or one or more combinations thereof. The computing device may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A system for providing one or more visualizations, the system comprising:

a plurality of imaging devices, each having at least one sensor;

an electronic display configured to display a graphical user interface; and a data processing engine operably coupled to the plurality of imaging devices and the electronic display, the data processing engine including:

at least one central processing unit (CPU) having one or more cores; and one or more computer storage memory having computer-executable instructions stored thereon that, when executed by the one or more cores, cause the one or more cores to:

receive image data from the plurality of imaging devices;

based on receiving the image data, initiate a first inspection of a first core of the one or more cores, the first inspection corresponding to a first imaging device of the plurality of imaging devices;

initiate a second inspection of the first core, the second inspection corresponding to a second imaging device of the plurality of imaging devices, wherein the first inspection and the second inspection are inspection cycles that each include at least a processing task and an idle period;

identify at least one unexpected event based on the first inspection and the second inspection of the first core;

provide, for display on the graphical user interface, a visualization of the first inspection and the second inspection of the first core depicted on a timeline having a starting point and an ending point;

determine a start time corresponding to the processing task and the idle period for the first inspection cycle and the second inspection cycle;

determine a standard error metric for each of the start time of the processing task and the idle period for the first inspection cycle and the second inspection cycle, wherein the standard error metrics for each task of the first inspection cycle are based on an average start time for historical processing tasks executed by the first core on the image data received by the first imaging device for a fixed framerate, and wherein the standard error metrics for each task of the second inspection cycle are based on an average start time for historical processing tasks executed by the first core on the image data received by the second imaging device for the fixed framerate;

provide, for display on the graphical user interface and based on the standard error metric for the start time of each of the processing task and the idle period for the first inspection cycle and the second inspection cycle, the visualization including a processing standard error bar and an idle period standard error bar on the timeline for the first inspection cycle and the second inspection cycle; and provide, for display on the graphical user interface, the at least one unexpected event depicted on the timeline of the visualization.

2. The system of claim 1, wherein a number of the plurality of imaging devices is greater than the number of the one or more cores.

3. The system of claim 1, wherein the visualization of the first inspection and the second inspection of the first core is provided based on a time associated with transferring the image data from each of the first imaging device and the second imaging device to the one or more computer storage memory.

4. The system of claim 1, wherein the visualization includes pre-processing tasks corresponding to the first inspection and the second inspection depicted on the timeline, wherein the pre-processing tasks include filtering and calibrating the image data received from the first imaging device and the second imaging device.

5. The system of claim 1, wherein the one or more cores are further caused to:

initiate a plurality of inspections of a second core of the one or more cores, each of the plurality of inspections corresponding to an imaging device of the plurality of imaging devices;

identify the at least one unexpected event based on the plurality of inspections of the second core; and provide the visualization including tasks of the first inspection, the second inspection, and the plurality of inspections of the second core depicted on the timeline.

6. The system of claim 1, wherein the one or more cores are further caused to:

receive additional image data from the first imaging device and the second imaging device;

based on receiving the additional image data, initiate a third inspection of the first core, the third inspection corresponding to the additional image data from the first imaging device;

based on receiving the additional image data, initiate a fourth inspection of the first core, the fourth inspection corresponding to the additional image data from the second imaging device;

determine, based on the third inspection and the fourth inspection, an updated standard error metric for the start time of each of the processing task and the idle period for the first inspection cycle and the second inspection cycle; and provide, for display on the graphical user interface and based on the updated standard error metric for the start time of each of the processing task and the idle period for the first inspection cycle and the second inspection cycle, the visualization including an updated processing standard error bar and an updated idle period standard error bar on the timeline for each of the first inspection cycle and the second inspection cycle.

7. The system of claim 1, wherein the standard error metric for each of the start time of the processing task and the idle period of the respective first inspection cycle and the second inspection cycle is calculated as a standard deviation.

8. The system of claim 1, wherein the at least one unexpected event is identified based on an idle time duration extending beyond a subsequent grabbing task of a subsequent inspection cycle, a start time of a subsequent grabbing task of a subsequent inspection cycle occurring after a predetermined start time, a start time of a subsequent grabbing task occurring beyond a predetermined time range, an idle time duration exceeding a threshold, or one or more combinations thereof.

9. A method for providing one or more visualizations, the method comprising:

receiving, at a data processing engine operably coupled to a plurality of imaging devices and an electronic display configured to display a user interface, image data from the plurality of imaging devices;

based on receiving the image data, initiating a plurality of inspection cycles of a plurality of cores of a central processing unit (CPU), each of the plurality of inspection cycles corresponding to at least one of the plurality of imaging devices, wherein each of the plurality of inspection cycles includes at least a processing task and an idle period subsequent to the processing task for the respective core;

providing, for display on the user interface, a visualization of the plurality of inspection cycles of the one or more cores, the visualization including the processing task and the idle period for each respective core depicted on a timeline;

determining a duration for the processing task and the idle period for each of the plurality of inspection cycles;

determining a standard error metric for the duration of the processing task and the idle period for each of the plurality of inspection cycles, the standard error metric based on an average duration of historical processing tasks and idle periods executed by a corresponding core of the plurality of cores for a fixed framerate;

identifying at least one unexpected event based on the standard error metrics for the tasks of the plurality of inspection cycles;

providing, for display on the user interface and based on the standard error metric for the duration of the processing task and the idle period for each of the plurality of inspection cycles, the visualization including a processing standard error bar and an idle period standard error bar depicted on the timeline for each of the plurality of inspection cycles along with the at least one identified unexpected event.

10. The method of claim 9, wherein the at least one unexpected event is identified based on at least one of the idle period standard error bars of the plurality of inspection cycles.

11. The method of claim 9, wherein the at least one unexpected event is identified based on the idle period standard error bar for one of the tasks of one of the plurality of inspection cycles being longer than a predetermined threshold.

12. The method of claim 9, wherein the image data received from the plurality of imaging devices corresponds to images that are each captured at a predetermined framerate by each of the plurality of imaging devices.

13. The method of claim 9, wherein each of the plurality of inspection cycles includes a grabbing task, a pre-processing task, and a processing task that are each executed by the one or more cores, and wherein the visualization includes the grabbing task, the pre-processing task, and the processing task for each of the plurality of inspection cycles depicted on the timeline.

14. The method of claim 13, wherein the grabbing task of a first inspection cycle of the plurality of inspection cycles includes a transfer of the image data from a first imaging device of the plurality of imaging devices to a first core of the one or more cores, and wherein the grabbing task of a second inspection cycle of the plurality of inspection cycles includes a transfer of the image data from a second imaging device of the plurality of imaging devices to memory of the data processing engine.

15. The method of claim 9, further comprising dynamically updating the standard error bars within the visualization of the processing task and the idle period for each of the plurality of inspection cycles based on the one or more changes to a corresponding average start time.

16. One or more non-transitory computer-readable storage media having computer-executable instructions embodied thereon that, when executed by one or more processors, perform a method for providing one or more visualizations, the method comprising:

receiving image data from a first imaging device;

based on receiving the image data, initiating an inspection cycle of at least one core of a data processing engine based on the at least one core executing a processing task and having an idle period during the inspection cycle;

identifying at least one unexpected event based on the inspection cycle and determining standard error metrics related to start times and/or durations of processing tasks and idle periods of historical inspection cycles of the at least one core executing the processing tasks of the historical inspection cycles on historical image data from the first imaging device for a fixed framerate; and causing to display, via a user interface, a visualization including processing tasks and idle periods the inspection cycle on a timeline along with standard error bars based on the standard error metrics for each of the processing tasks and idle periods; and causing to display, via a user interface, the visualization further including the at least one unexpected event on the timeline.

17. The one or more non-transitory computer-readable storage media of claim 16, wherein the data processing engine is processing the image data from each of a plurality of imaging devices, including the first imaging device, in parallel using a plurality of cores including the at least one core.

18. The one or more non-transitory computer-readable storage media of claim 16, wherein the first imaging device is an optical character recognition device.

19. The one or more non-transitory computer-readable storage media of claim 16, wherein the method further comprises determining a start time for the processing task and the idle period for the inspection cycle, and providing the visualization including the processing task and the idle period depicted on the timeline based on the start time for the processing task and the start time for the idle period.

20. The one or more non-transitory computer-readable storage media of claim 16, the method further comprising:

receiving image data from a second imaging device and a plurality of imaging devices;

based on receiving the image data from the second imaging device, initiating a second inspection cycle of the at least one core based on the at least one core executing a processing task and having an idle period during the second inspection cycle;

based on receiving the image data from the plurality imaging devices, initiating an inspection cycle corresponding to each of the plurality of imaging devices based on a second core of the data processing engine executing a processing task and having an idle period during each inspection cycle corresponding to each of the plurality of imaging devices; and causing to display the visualization further including the second inspection cycle and each inspection cycle corresponding to each of the plurality of imaging devices.

* * * * *